US012267574B1

United States Patent
Pachikov et al.

(10) Patent No.: US 12,267,574 B1
(45) Date of Patent: Apr. 1, 2025

(54) OPTIMIZING DYNAMIC OBSERVATION WITH AN AUTONOMOUS CAMERA VEHICLE BASED ON UNCERTAIN SENSOR DATA

(71) Applicant: Sunflower Labs Inc., San Carlos, CA (US)

(72) Inventors: Alexander S. Pachikov, San Carlos, CA (US); Christian Eheim, Fällanden (CH); Yannik S. Nager, Zürich (CH)

(73) Assignee: Sunflower Labs Inc., San Carlos, CA (US)

( * ) Notice: Subject to any disclaimer, the term of this patent is extended or adjusted under 35 U.S.C. 154(b) by 37 days.

(21) Appl. No.: 16/804,860

(22) Filed: Feb. 28, 2020

Related U.S. Application Data

(60) Provisional application No. 62/815,442, filed on Mar. 8, 2019.

(51) Int. Cl.
| | | |
|---|---|---|
| *H04N 23/57* | (2023.01) | |
| *B60R 1/23* | (2022.01) | |
| *H04N 7/18* | (2006.01) | |

(52) U.S. Cl.
CPC ............... *H04N 23/57* (2023.01); *B60R 1/23* (2022.01); *H04N 7/18* (2013.01); *B60R 2300/303* (2013.01)

(58) Field of Classification Search
None
See application file for complete search history.

(56) References Cited

U.S. PATENT DOCUMENTS

| | | | | |
|---|---|---|---|---|
| 5,133,019 A | * | 7/1992 | Merton | G07D 5/00 194/302 |
| 6,064,759 A | * | 5/2000 | Buckley | G01B 11/024 348/125 |
| 2009/0245573 A1 | * | 10/2009 | Saptharishi | G06V 20/52 382/103 |
| 2017/0287295 A1 | * | 10/2017 | Aswath | G08B 13/19621 |
| 2019/0164575 A1 | * | 5/2019 | Bai | H04N 5/9201 |

* cited by examiner

Primary Examiner — Mikhail Itskovich
(74) Attorney, Agent, or Firm — Muirhead and Saturnelli, LLC

(57) ABSTRACT

Directing a camera vehicle includes detecting dynamic objects within a property perimeter that is monitored by the camera vehicle, estimating positions and motion vectors of the objects, and directing the camera vehicle to observe the objects in response to there being uncertainty in estimating the positions and motion vectors of the objects. Motion sensors disposed in the property perimeter may be used to detect dynamic objects. The uncertainty may correspond to co-axial object movement when at least one of the objects moves radially with respect to at least one of the sensors. The uncertainty may correspond to a sudden change of object direction, a sudden acceleration of an object, and/or joint movements of multiple objects. Uncertainty areas may correspond to portions within the property perimeter where the uncertainty in estimating the positions and motion vectors of the objects is detected. The camera vehicle may be an unmanned aerial vehicle.

2 Claims, 4 Drawing Sheets

OPTIMIZING DYNAMIC OBSERVATION WITH AN AUTONOMOUS CAMERA VEHICLE BASED ON UNCERTAIN SENSOR DATA

CROSS-REFERENCE TO RELATED APPLICATIONS

This application claims priority to U.S. Prov. App. No. 62/815,442, filed on Mar. 8, 2019, and entitled "OPTIMIZING DYNAMIC OBSERVATION WITH AN AUTONOMOUS CAMERA VEHICLE BASED ON UNCERTAIN SENSOR DATA", which is incorporated herein by reference.

TECHNICAL FIELD

This application is directed to the field of information processing from a vehicle with a mounted camera, and more particularly to optimizing vehicle position and view angles for dynamic observation of an area with distributed set of sensors that may provide uncertain position and velocity data for captured objects.

BACKGROUND OF THE INVENTION

Markets for Unmanned Aerial Vehicles (UAVs, drones, multicopters) are quickly expanding worldwide. Global market size is expected to grow to $13.4 billion by the end of 2025 at a compound annual growth rate of 13.7% in 2020-2025. In the US, a significant growth followed the creation by the Federal Aviation Administration (FAA) of a regulatory framework for consumer and commercial drones. According to industry forecasts, the global market revenue from drones will grow to $11.2 billion by 2020. The FAA projects shipments of hobbyist drones to increase 3.2 times to 3.55 million units by 2021. Major application areas for drones are evolving in industrial inspections, agriculture, mapping surveillance, modeling, delivery, security, etc. Additionally, new classes of autonomous camera vehicles are being developed, including autonomous cars, unmanned surface vehicles (watercraft), etc.

There are approximately 76 million free-standing, single family homes in the US. Almost 56 million homes are in lightly populated areas that are outside of city centers and dense urban environments with only 30% of those homes currently having some kind of a home security system. This indicates a high unsatisfied demand in advanced home security systems.

New types of property security systems developed by companies like Sunflower Labs, Inc., focus on perimeter and property security. Such systems combine a network of motion, vibration and other sensors distributed across a customer property. A central station is used to detect and categorize dynamic objects, extraordinary situations and potential intruders on the property by integrating signals from sensors. An autonomous vehicle with a camera (for example, a multicopter) that has a permanent landing station on the property may be dispatched to areas of interest to provide live video stream to a remote user or to transmit video signals to a cloud-based service.

Motion sensors in sensor units may have a circular disposition with overlapping detection zones and may be directed at different angles to the horizontal plane, thus expanding vertical reach of the tracking system and allowing for object height estimation. When an object appears in a tracking area of one or more motion sensors of a particular sensor unit, the object may be registered by several sensors in the array. This may allow an instant estimate of object size and shape. When the object is moving, the set of motion sensors that register the object may allow estimation of an objects position and velocity (state) based on this data.

Notwithstanding efficient construction and configuration of sensors, a tracking environment represented by a network of sensors is heterogeneous and may result in significant uncertainties in the estimated positions and speeds of one or multiple objects moving within the tracking zones. Such uncertainties may complicate finding an optimal pose (position and orientation) trajectory for the autonomous inspecting vehicle.

Accordingly, it is desirable to be able to track uncertainties of state estimates of dynamic objects within a property perimeter and to optimize a pose trajectory for an autonomous camera vehicle to secure optimal views of the property during inspections.

SUMMARY OF THE INVENTION

According to the system described herein, directing a camera vehicle includes detecting dynamic objects within a property perimeter that is monitored by the camera vehicle, estimating positions and motion vectors of the objects, and directing the camera vehicle to observe the objects in response to there being uncertainty in estimating the positions and motion vectors of the objects. Motion sensors disposed in the property perimeter may be used to detect dynamic objects. The uncertainty may correspond to co-axial object movement when at least one of the objects moves radially with respect to at least one of the sensors. The uncertainty may correspond to a sudden change of object direction, a sudden acceleration of an object, and/or joint movements of multiple objects. Uncertainty areas may correspond to portions within the property perimeter where the uncertainty in estimating the positions and motion vectors of the objects is detected. The uncertainty areas may expand in response to increasing estimation ambiguity and shrink in response to decreasing estimation ambiguity. The uncertainty areas may split in response to at least some of the objects diverging and merge in response to at least some of the objects coming together. The uncertainty areas may form an uncertainty map that is used to direct the camera vehicle. The camera vehicle may be directed to an individual one of the uncertainty areas, a selected group of the uncertainty areas or an entirety of the uncertainty map. Viewing positions and camera angles for the camera vehicle may be dynamically chosen to maximize a likelihood of capturing the objects in a camera frame of the camera vehicle based on the uncertainty map. The viewing positions and camera angles for the camera vehicle may be dynamically chosen in response to changes in the uncertainty map. Directing the camera vehicle may include accounting for obstacles in the property perimeter. The obstacles may block a travel path of the camera vehicle and/or a view of the camera. The camera vehicle may be an unmanned aerial vehicle.

According further to the system described herein, a non-transitory computer-readable medium contains software that directs a camera vehicle. The software includes executable code that detects dynamic objects within a property perimeter that is monitored by the camera vehicle, executable code that estimates positions and motion vectors of the objects, and executable code that directs the camera vehicle to observe the objects in response to there being uncertain. Motion sensors disposed in the property perimeter may be used to detect dynamic objects. The uncertainty may correspond to co-axial object movement when at least one of the objects moves radially with respect to at least one of the sensors. The uncertainty may correspond to a sudden change of object direction, a sudden acceleration of an object, and/or joint movements of multiple objects. Uncertainty areas may correspond to portions within the property perimeter where the uncertainty in estimating the positions and motion vectors of the objects is detected. The uncertainty areas may expand in response to increasing estimation ambiguity and shrink in response to decreasing estimation ambiguity. The uncertainty areas may split in response to at least some of the objects diverging and merge in response to at least some of the objects coming together. The uncertainty areas may form an uncertainty map that is used to direct the camera vehicle. The camera vehicle may be directed to an individual one of the uncertainty areas, a selected group of the uncertainty areas or an entirety of the uncertainty map. Viewing positions and camera angles for the camera vehicle may be dynamically chosen to maximize a likelihood of capturing the objects in a camera frame of the camera vehicle based on the uncertainty map. The viewing positions and camera angles for the camera vehicle may be dynamically chosen in response to changes in the uncertainty map. Directing the camera vehicle may include accounting for obstacles in the property perimeter. The obstacles may block a travel path of the camera vehicle and/or a view of the camera. The camera vehicle may be an unmanned aerial vehicle.

The proposed system estimates and tracks uncertainties in object positions and velocities by sensors distributed across a property and calculates a trajectory of poses of a camera vehicle, such as a flight path for an Unmanned Aerial Vehicle (UAV) deployed for inspecting objects, optimized towards maximizing object visibility in the camera frame, while minimizing other factors such as flight time and energy consumption.

System installation includes a spatially distributed network of sensors grouped into sensor arrays, or sensor units. The observable areas of a sensor may have significant overlap with observable areas from other sensors. Additionally, the sensors may be directed at different angles to the horizontal plane, expanding a vertical reach of a tracking system and allowing for object height estimation. For example, half of the motion sensors of a sensor unit may have tracking areas looking upward at a certain angle, while the other half may have tracking areas looking downward at the same angle.

When an object appears within an observable area of one or more motion sensors of a particular sensor unit, it may be registered by several sensors in the array. This allows for an estimation of the a relative position and velocity of the object. By combining estimates of multiple sensors, a more precise estimate can be obtained.

In general, the configuration of a network of sensors and sensor units may allow positional tracking of objects in observable areas of the property. Main points and areas of interest (POIs) on the property (the front door, the back door, the front yard, the power station located on the property, etc.) may be named (labeled) during the configuration of the system, so that coordinates on the map may be associated with the closest POIs.

When dynamic objects are detected within a property perimeter by sensor(s), positions and motion vectors of the objects are estimated.

However, there are many sources of uncertainty that make it impossible to precisely determine positions and motion vectors of dynamic objects at all times. Uncertainties may arise from various sources, including:

1. Uncertainty due to sensor limitations. The sensors may have limited observation capabilities due to the sensor parameters or the geometrical setup of one or multiple sensors and an interplay between the sensors and the environment, which may result in certain states not being directly observable. For example, a motion sensor may only be able to detect motion of an object within a tracking area of the sensor but lack the capability to measure a distance of the object from the sensor. If the object is detected by a single motion sensor, a position estimate based on the sensor may possess a significant uncertainty.
2. Uncertainty due to noise in sensor measurements. Measurement noise may be propagated through the estimation pipeline and cause uncertainty.
3. Uncertainty due to model errors. Assumptions about models such as the sensor model, environmental model and object models that are used within an estimation algorithm may be uncertain and may cause uncertainty in the estimation.

While estimating positions and velocities of an object, the system may also estimate and track uncertainties of the positions and velocities based on the known uncertainty sources and the tracking history of objects. Furthermore, the states of objects may be extrapolated to a certain time interval. Simultaneously, uncertainties of state predictions may be propagated. Current and future state uncertainties of tracked objects may be projected to an uncertainty area representing the tracked object's positional uncertainty.

Additionally, shapes and dynamic patterns of uncertainty areas for different types of positional uncertainties may depend on object behavior as follows:

(a) An uncertainty area for a co-axial object movement, when an object moves radially rather than tangentially to/from a sensor, may be pictured as an elongated oval with a longer axis aligned with the movement direction. The size and eccentricity of the uncertainty area may depend on the speed of object movement.

(b) An uncertainty area developing due to a sudden change of object direction may depend on the original object direction, the sharpness of change (the angle between the original and the new directions) and the object speed. In an example of case #2 above, the uncertainty area breaks the pattern of precise tracking and may be approximated by an oval that moves in the new direction, the size of the oval may depend on sensor parameters, in addition to the already listed characteristics of the object trajectory.

(c) An uncertainty area emerging because of a sudden acceleration of an object may grow with the object speed and may follow object direction. If the acceleration is significant, the system may experience delays in object tracking after the object reaches a certain speed limit, due to sensor capturing thresholds. Accordingly, the system may enlarge the estimated uncertainty area to compensate for the unknown object position.

(d) Uncertainty areas due to joint movements of multiple objects may take many forms and may combine each of the uncertainty area patterns (a)-(c) for each of the objects, moving independently or in coordination with each other. Additionally, distances between objects may be constantly changing, causing uncertainty areas for different objects tracked independently to merge and split at various times.

Shape, size and configuration of uncertainty areas for moving objects on the property may also depend on the density of sensors in various locations across the property. When a state of a moving object is tracked simultaneously by two or more sensors (possibly from the same sensor unit), a corresponding uncertainty area may be smaller compared to tracking by a single sensor.

Uncertainty areas may be dynamically changing as objects progress across the property, while simultaneously changing their positions, grouping and behavior, as explained elsewhere herein. The system may track the dynamics of uncertainty areas, which may result in further categorization of uncertainty configurations by the dynamic size and object grouping of the uncertainty configurations, for example:

Expanding uncertainty areas (due to increasing estimation ambiguity).

Shrinking uncertainty areas.

Splitting uncertainty areas when several objects diverge (for example, two intruders choosing different paths to exploring a property).

Merging uncertainty areas when several distinct objects come together.

The dynamic uncertainty area at some time instance may be represented as a heat map, where the value at each location represents the probability of an object being present at that location and time. The more uncertain the position of an object is, the more widespread is a representation of the object on the map. The map may be used for various purposes. If a decision has been made to direct a camera vehicle, such as a UAV, to inspect an individual uncertainty area, a selected group of uncertainty areas or the whole uncertainty map, the system may optimize the pose trajectory of the UAV for obtaining the best possible views of the objects, taking into account the uncertainty areas.

Pose trajectory optimization may follow different scenarios:

(i) The viewpoint optimization scenario is aimed at maximizing the possibility of having the uncertainty area's underlying objects within the camera field of view, while reaching such pose(s) in the shortest amount of time and maximizing the time spent seeing the uncertainty area along the trajectory.

(ii) The dynamic sweep scenario targets scanning all uncertainty areas selected for inspection by the camera vehicle, in a minimal time, without necessarily obtaining a global view of all objects within the combined uncertainty area. This pose trajectory optimization scenario may be used to scan a dynamically developing uncertainty area (analogously to the viewpoint optimization), as well as to a retrospective viewing (reviewing) of an accumulated uncertainty area—for example, reviewing a path that an unknown person has followed on a property to determine if a damage has been made to the house.

In both scenarios, the system may employ standard path planning methods, such as A*, RRT* or GLC. The efficiency of these methods may depend, among other factors, on the choice of an additive cost function and of the stopping criteria. Thus, for a viewpoint optimization scenario, the cost function may be chosen as a weighted sum of the travel distance and the additional cost of coverage of the uncertainty area. The latter may be represented by the ratio of the size of the uncertainty area within the camera's field of view to the size of the overall camera's field of view and/or the ratio with the same numerator and the denominator equal to the total size of the uncertainty area targeted for viewing. The stopping criteria may be a threshold of the quality of view of the uncertainty area.

Viewing positions and camera angles may be chosen such that the likelihood of capturing the object in the camera frame is maximized. For example, the UAV position and camera angle may be chosen based on the camera parameters, the current size of the uncertainty area, and the property map with obstacles (such as trees, buildings, etc.) to fill the camera view with the uncertainty area to the maximum possible extent. Subsequently, the system may update the flight trajectory of the camera vehicle to secure a persistent view of the object.

In addition to directing a camera vehicle to specified uncertainty areas, the system may identify objects to reduce the uncertainty of object state estimates within the observed area and improve viewing conditions for the camera.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for estimating and tracking uncertainties in detected object positions, directions and velocities by motion sensors distributed across a property, building and maintaining uncertainty areas and calculating optimal pose trajectories of a camera vehicle deployed for property inspections.

Figure 1:
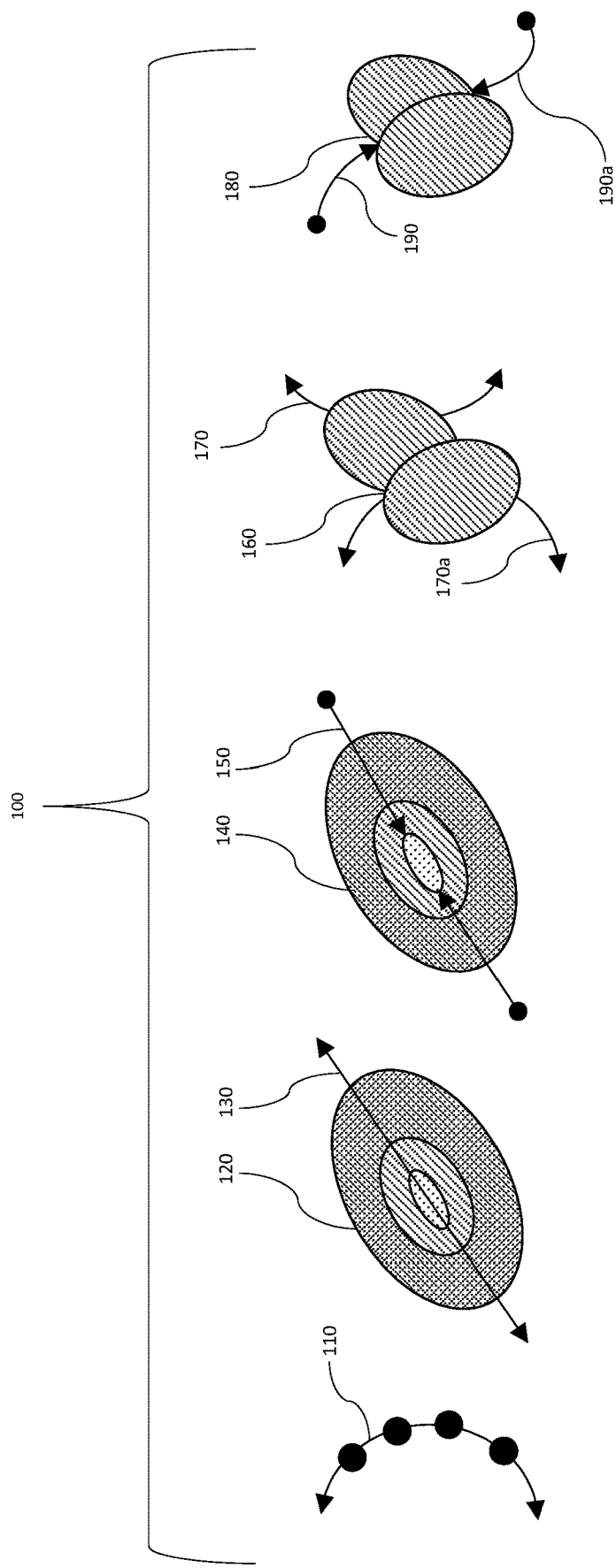
FIG. 1 is a schematic illustration of progression and categorization of dynamic uncertainty areas, according to an embodiment of the system described herein.

FIG. 1 is a schematic illustration of progression and categorization of dynamic uncertainty areas that shows schematic charts and pictograms 100 of a low positional uncertainty area chart 110; an expanding uncertainty area chart 120, growing in a predominant direction 130; a contracting uncertainty area chart 140, shrinking in a predominant direction 150; a splitting uncertainty area chart 160, diverging along the object trajectories 170, 170a; and a merging uncertainty area chart, joining along the object trajectories 190, 190a. The schematic charts and pictograms 100 are mentioned below in connection with discussion of the other FIGS.

Figure 2B:
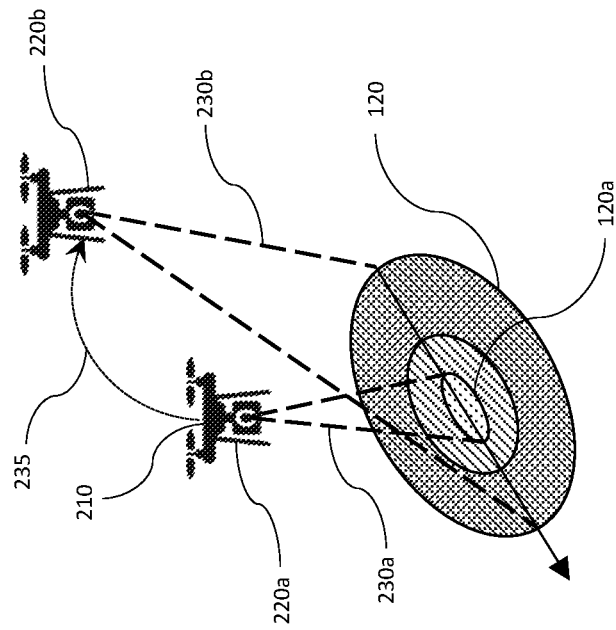
FIGS. 2A-2C are schematic illustrations of camera vehicle positioning and repositioning for optimal viewing of collections of objects with uncertain positions, according to an embodiment of the system described herein.
Figure 2A:
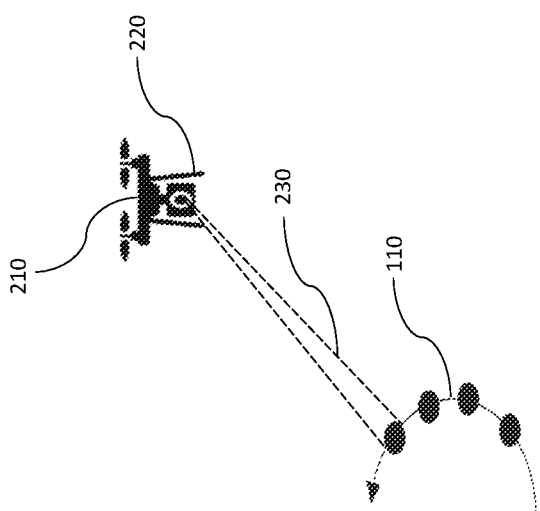
Figure 2C:
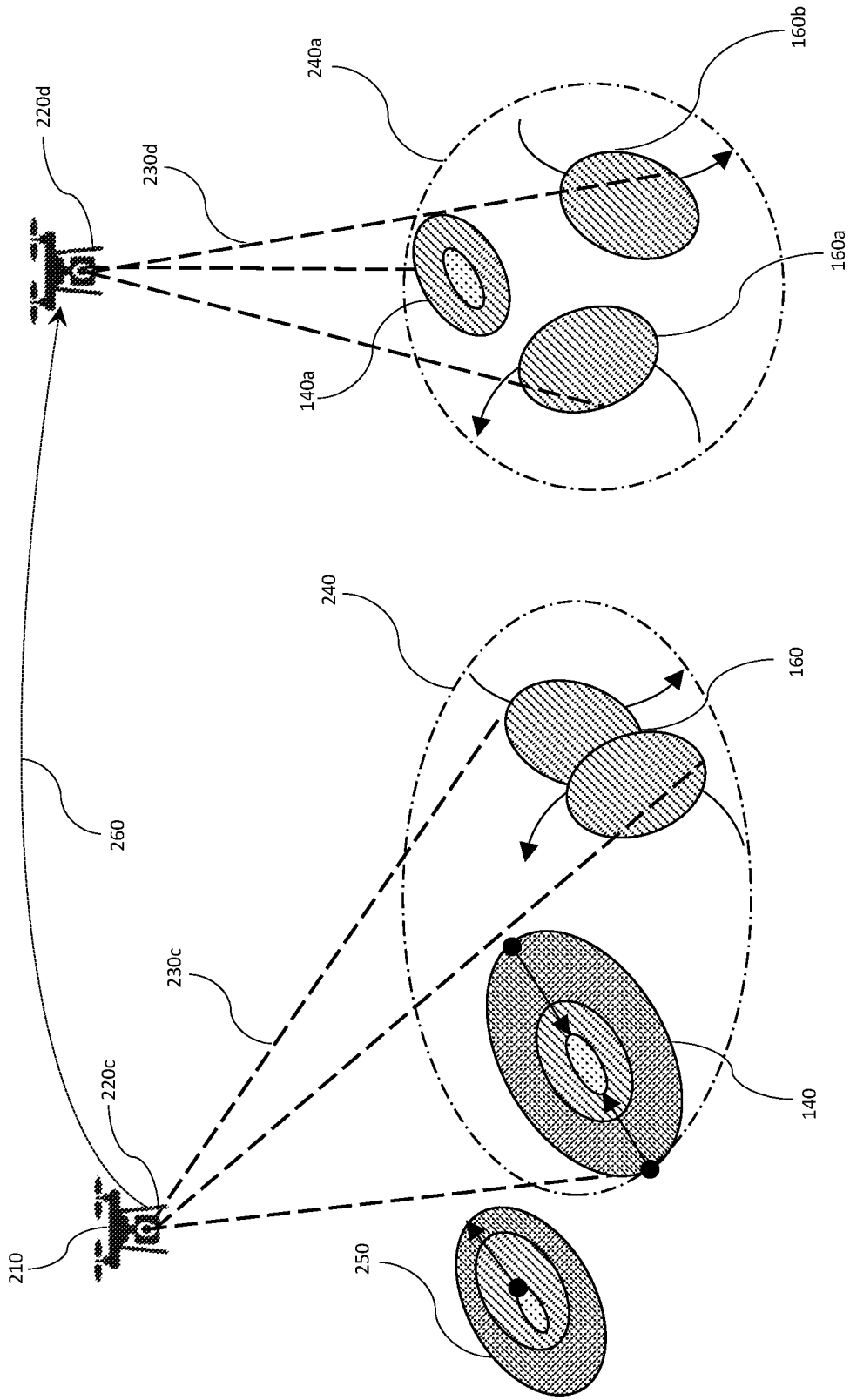

FIGS. 2A-2C are schematic illustrations of a camera vehicle positioning and pose trajectories for optimal viewing of collections of objects with uncertain positions. The system described herein may be configured to operate with a residential security system described, for example, in U.S. patent Ser. No. 10,614,688 to Pachikov, et al. which issued on Apr. 7, 2020, (hereinafter, "the '688 patent") and titled: "DETECTING AND IDENTIFYING ACTIVITIES AND EVENTS WITHIN A PROPERTY'S SECURITY PERIMETER USING A CONFIGURABLE NETWORK OF VIBRATION AND MOTION SENSORS", which is incorporated by reference herein. Thus, the system described herein may use vibration sensors, motion sensors, etc. that provide information to a central station that also receives video information from the camera vehicle. As described in the '688 patent, an unknown object may be detected by motion and vibration sensors and may be triangulated by closest ones of the sensors. As the object moves along a trajectory, tracking the object may switch between different ones of the motion and vibration sensors.

FIG. 2A schematically illustrates vehicle positioning and camera view settings for nearly precise tracking (low positional uncertainty). An object with low positional uncertainty with the area chart 110 is inspected by a camera vehicle 210, which, in this example, is an unmanned aerial vehicle (UAV). A position 220 and a view angle 230 may be chosen to put the camera vehicle 210 relatively close above the object (with due respect to potential obstacles on the property, such as trees and buildings), subject to optimization of pose trajectory, explained elsewhere herein, so the object may be inspected in greater details and tracking movements of the object will not require significant repositioning of the camera vehicle 210, perhaps limited to turning for camera targeting and short flight fragments.

FIG. 2B is a schematic illustration of vehicle initial positioning and repositioning and of camera view settings for an expanding uncertainty area. The camera vehicle (UAV) 210 is inspecting an object or multiple objects captured by sensors corresponding to the expanding uncertainty area 120. At the start of inspection, the vehicle 210 is positioned at a location 220*a* and the camera is set at a view direction and angle 230*a* to inspect an initial, smaller uncertainty area 120*a*, where the location 220*a* and the angle 230*a* represent the beginning point of an optimal pose trajectory. As the estimation uncertainty increases, as explained elsewhere herein (see, for example, FIG. 1), the system recalculates the projected size and shape of the uncertainty area and the flight path, as well as the parameters of camera view, and the camera vehicle 210 is instructed to fly along an optimized path 235; a new position 220*b* of the camera vehicle and a direction and angle 230*b* of the camera are shown at an end of inspection and are optimized for viewing of the expanded uncertainty area 120.

FIG. 2C is a schematic illustration of vehicle initial positioning and repositioning and of camera view settings for multiple dynamic uncertainty areas. The camera vehicle (UAV) 210 is dispatched to inspect multiple uncertainty areas representing multiple objects and groups of objects with different behaviors. First, the system prioritizes identified objects on the property and determines an observation area 240; in FIG. 2C, the observation area 240 includes a contracting uncertainty area represented by the uncertainty area chart 140 and a splitting uncertainty area represented by the uncertainty area chart 160, while moving object(s), represented by an expanding area chart 250, are deprioritized and excluded from the inspection task. An initial position 220*c* and parameters of a camera view 230*c* are optimized for viewing of uncertainty areas within the original observation area 240. The uncertainty areas change when the contracting uncertainty area 140 shrinks to an intermediate size, location and shape 140*a*, while the objects from the splitting uncertainty area 160 diverge and form separately moving uncertainty areas 160*a*, 160*b*; all changes result in an updated observation area 240*a*. As the uncertainty areas change, the system recalculates an optimal pose trajectory 260 and new position and camera view parameters 220*d*, 230*d* to ensure ongoing optimal conditions for inspection of the observation area by the camera vehicle.

Figure 3:
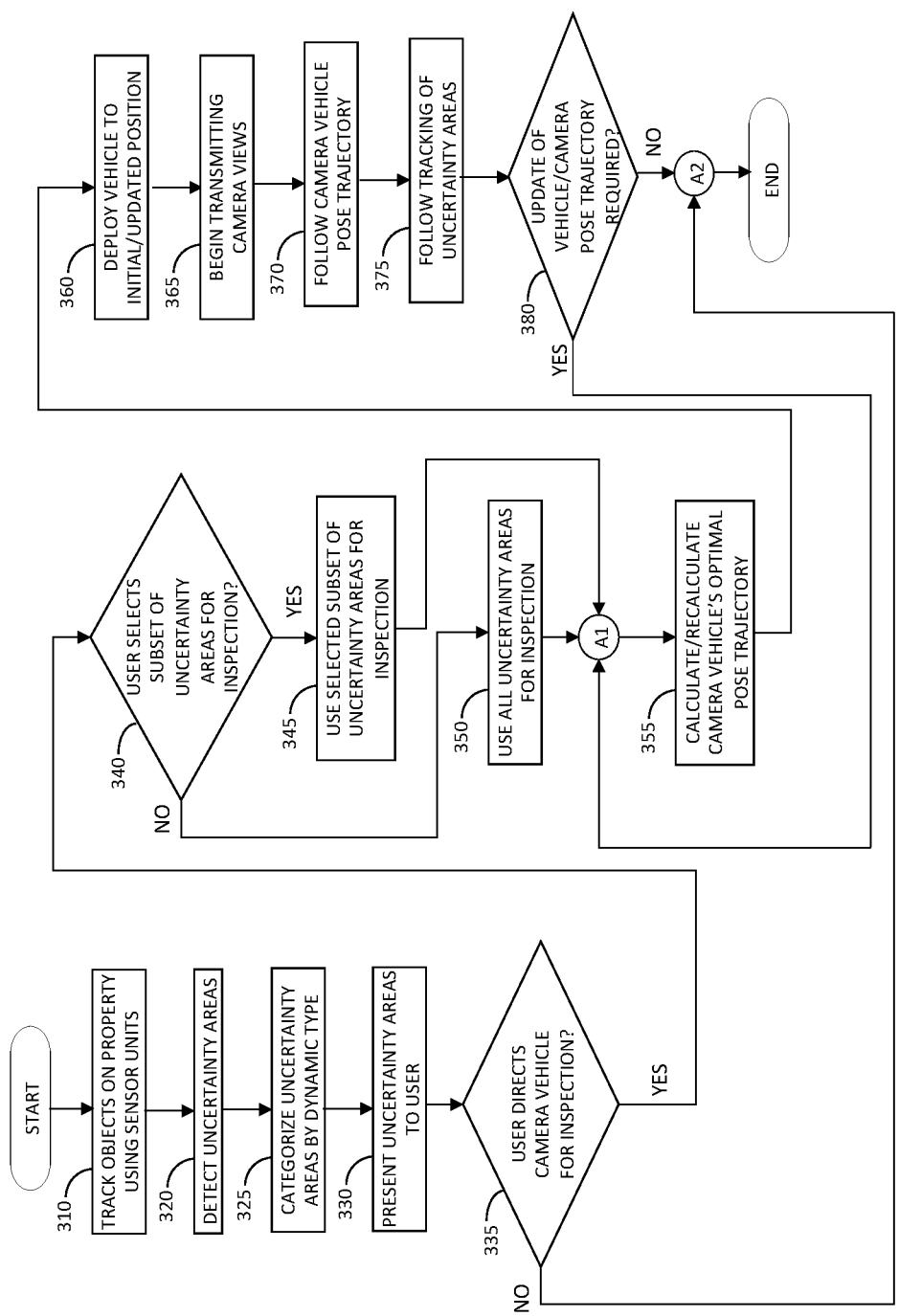
FIG. 3 is a system flow diagram illustrating system functioning in connection with identification of uncertainty areas and optimizing position and view angle of a camera vehicle, according to an embodiment of the system described herein.

Referring to FIG. 3, a system flow diagram 300 illustrates system functioning in connection with identification of uncertainty areas and optimizing position and view angle of a camera vehicle. Processing begins at a step 310, where the system tracks objects within the property security perimeter using sensors. After the step 310, processing proceeds to a step 320, where the system identifies uncertainty areas. After the step 320, processing proceeds to a step 325, where uncertainty areas are categorized by a dynamic type, as explained elsewhere herein, in particular, in FIG. 1 and the accompanying text. After the step 325, processing proceeds to a step 330, where the system presents the identified uncertainty areas to the user.

After the step 330, processing proceeds to a test step 335, where it is determined whether the user directs a camera vehicle for property inspection. If not, then processing is complete; otherwise, processing proceeds to a test step 340, where it is determined whether the user selects a subset of uncertainty areas for inspection (as illustrated, for example, by the items 240, 250 in FIG. 2C, where the item 240 represents the selected subset of uncertainty areas, whereas the item 250 is excluded from the inspection). If the user selects a subset of uncertainty areas for inspection, processing proceeds to a step 345, where the system uses the selected subset of uncertainty areas for inspection by the camera vehicle(s). After the step 345, processing proceeds to a step 355, where the system calculates or recalculates an optimal pose trajectory for the camera vehicle. After the step 355, processing proceeds to a step 360, where the camera vehicle is deployed to the initial or updated position. After the step 360, processing proceeds to a step 365, where the camera vehicle begins transmitting camera views from a new position and view angle of the vehicle and the camera of the vehicle. After the step 365, processing proceeds to a step 370, where the camera vehicle follows the pose trajectory for the period of time covered by calculation/recalculation at the step 355. After the step 370, processing proceeds to a step 375, where the system follows tracking of uncertainty areas by the sensors. After the step 375, processing proceeds to a test step 380, where it is determined whether an update of the vehicle-camera routine for continuing the inspection is required. If not, processing is complete; otherwise, processing proceeds to the step 355, which may be independently reached from the step 345. If it was determined at the test step 340 that the user does not select a subset of uncertainty areas for inspection, processing proceeds to a step 350, where the system uses all uncertainty areas for inspection. After the step 350, processing proceeds to the step 355, which may be independently reached from the step 345 and the test step 380.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functions may vary from the illustrations presented herein. Further, various aspects of the system described herein may be implemented using various applications and may be deployed on various devices, including, but not limited to smartphones, tablets and other mobile computers. Mobile devices with touch screens, such as smartphones and tablets, may use operating system(s) selected from the group consisting of: IOS, Android OS, Windows Phone OS, Blackberry OS and mobile versions of Linux OS. Mobile computers and tablets may also use operating system selected from the group consisting of Mac OS, Windows OS, Linux OS, Chrome OS. Portions of the system may be implemented on cloud servers and communicate with mobile devices and vehicles via wireless connections.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of directing a camera vehicle, comprising:
   detecting dynamic objects within a perimeter of a property that is monitored by the camera vehicle;
   tracking the objects by capturing positions and motion vectors of the objects using sensors that are independent of the camera vehicle and are distributed throughout the property;
   determining one or more uncertainty areas corresponding to possible locations of the objects based on captured positions and motion vectors from the sensors that are distributed throughout the property and are independent of the camera vehicle; and
   dispatching the camera vehicle to observe the one or more uncertainty areas only after capturing positions and motion vectors of the objects using the sensors that are independent of the camera vehicle,
   wherein the one or more uncertainty areas split in response to at least some of the objects diverging and merge in response to at least some of the objects coming together.

2. A non-transitory computer-readable medium containing software that directs a camera vehicle, the software comprising:
   executable code that detects dynamic objects within a perimeter of a property that is monitored by the camera vehicle;
   executable code that tracks the objects by capturing positions and motion vectors of the objects using sensors that are independent of the camera vehicle and are distributed throughout the property;
   executable code that determines one or more uncertainty areas corresponding to possible locations of the objects based on captured positions and motion vectors from the sensors that are distributed throughout the property and are independent of the camera vehicle; and
   executable code that dispatches the camera vehicle to observe the one or more uncertainty areas only after capturing positions and motion vectors of the objects using the sensors that are independent of the camera vehicle,
   wherein the one or more uncertainty areas split in response to at least some of the objects diverging and merge in response to at least some of the objects coming together.

* * * * *